United States Patent [19]
Han et al.

[11] Patent Number: 6,002,999
[45] Date of Patent: Dec. 14, 1999

[54] INTERFACE APPARATUS AND METHOD BETWEEN A SELECTOR AND A PLURALITY OF VOCODERS IN A MOBILE COMMUNICATION SYSTEM

[75] Inventors: Jin Soo Han; Byong Jin Cho, both of Seoul, Rep. of Korea

[73] Assignee: Hyundai Electronics Industries Co., Ltd., Rep. of Korea

[21] Appl. No.: 08/639,814

[22] Filed: Apr. 25, 1996

[30] Foreign Application Priority Data

Apr. 26, 1995 [KR] Rep. of Korea ................ 95-9997

[51] Int. Cl.⁶ .................................................. G10L 3/00
[52] U.S. Cl. ................................ 704/201; 704/200
[58] Field of Search ..................... 395/2.09; 704/200, 704/201, 226, 227, 228

[56] References Cited

U.S. PATENT DOCUMENTS 5,195,091  3/1993  Farwell et al. .................... 370/336
5,307,405  4/1994  Sih ................................... 379/410
5,475,686  12/1995  Bach et al. ........................ 370/84

*Primary Examiner*—Richemond Dorvil
*Attorney, Agent, or Firm*—Saliwanchik, Lloyd & Saliwanchik

[57] ABSTRACT

An interface apparatus and method for interfacing between a selector and a plurality of vocoders in a mobile communication system includes a main processor contained in the selector; a transmitting/receiving frame tick generator for generating a transmitting/receiving frame tick every 20 msec, to be supplied to the main processor; a buffer operation adjustor for enabling and disabling a selected buffer out of 15 buffers according to a control signal received from the main processor; a plurality of buffers connected one by one to a plurality of vocoding modules, for operating according to the control of the buffer operation adjustor. The plurality of vocoders for coding and decoding a voice signal.

7 Claims, 2 Drawing Sheets

INTERFACE APPARATUS AND METHOD BETWEEN A SELECTOR AND A PLURALITY OF VOCODERS IN A MOBILE COMMUNICATION SYSTEM

BACKGROUND OF THE INVENTION

The present invention relates to an interface apparatus and method for interfacing between a selector and a plurality of vocoders in a mobile communication system, and more particularly to an interface apparatus and method for interfacing a plurality of vocoding modules for coding/decoding a voice signal with a selector in a code division multiple access (CDMA) mobile communication system.

Generally, a mobile communication system, such as a cellular phone, portable phone, etc., is broadly divided into a radio base station, a mobile telephone terminal, and a mobile telephone exchange. A selector and a vocoder included therein code and decode voice data between the radio base station, to which a plurality of terminals are subscribed, and the exchange, and select a corresponding line by analyzing the voice data. The type of interface between the selector and the vocoder can be classified as follows:

First, there is serial access. The serial access has an advantage in that the burden of processing interrupts at a main processor of the selector is reduced. However, the relationship between the selector and the vocoder is of the form of a master and slave, and it therefore is necessary to design hardware connecting vocoding modules with one another and software or firmware corresponding thereto.

Second, there is parallel access. In parallel access, the main processor of one selector is connected, one by one, to the vocoding module. Therefore, although the whole construction is connected in parallel, it is difficult to design an efficient select board.

A technique for adaptive synchronization arrangement for a CDMA cellular radio-telephone system is disclosed in U.S. Pat. No. 5,195,091. This patent describes mutual transmission, including a destination interface identification board address and a port address in a transmission frame. However, interfacing using a buffer is not described.

BRIEF SUMMARY OF THE INVENTION

It is therefore an object of the invention to provide an interface apparatus and method for interfacing between one selector and a plurality of vocoders for accessing a plurality of vocoding modules by a main processor of the selector without a bus arbitration circuit.

According to one feature of the invention, an interface apparatus between a selector and a plurality of vocoders in a mobile communication system includes: a main processor contained in the selector; a transmitting/receiving frame tick generator for generating a transmitting/receiving frame tick every 20 msec, to be supplied to the main processor; a buffer operation adjustor for enabling and disabling a selected buffer out of 15 buffers, according to a control signal received from the main processor; a plurality of buffers, with each buffer being connected to a vocoding module within a plurality of vocoders, for operating according to the control of the buffer operation adjustor; and the plurality of vocoders for coding and decoding a voice signal.

DETAILED DISCLOSURE OF THE INVENTION

Figure 1:
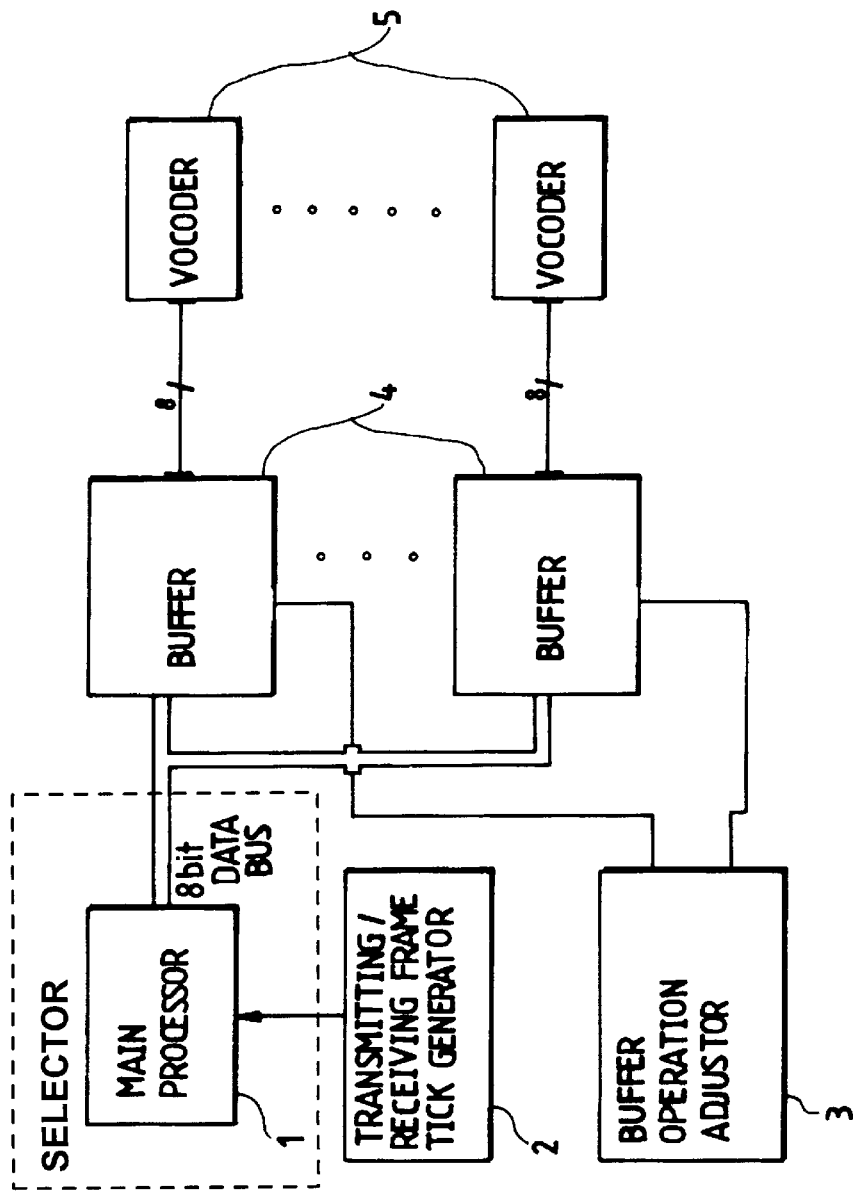
FIG. 1 is a block diagram illustrating an interface apparatus between a selector and a plurality of vocoders according to the invention.

Referring to FIG. 1, a main processor 1 is contained in a selector. A transmitting/receiving frame tick generator 2 generates a transmitting/receiving frame tick every 20 msec to be supplied to the main processor 1. A buffer operation adjustor 3 enables and disables a selected buffer out of 15 buffers according to a control signal received from the main processor 1. A plurality of buffers 4, connected one by one to a plurality of vocoding modules, operates according to the control of the buffer operation adjustor 3. A plurality of vocoders 5 codes and decodes a voice signal.

In operation, the main processor 1 should transmit and receive the transmitting/receiving frame with the vocoding module every 20 msec, and this is enabled by the transmitting/receiving frame tick generator 2 connected thereto. The main processor 1 generates the control signal for enabling the buffer of the vocoder to be connected, according to an interrupt signal generated from the transmitting/receiving frame tick generator 2. The buffer operation adjustor 3 receiving the control signal enables a corresponding buffer. When the corresponding buffer is enabled, the main processor 1 generates data to be transmitted. If the data is transmitted, the enabled buffer is disabled by the buffer operation adjustor 3 and the buffer operation adjustor 3 is readied to enable the next corresponding buffer.

If data is stored in the buffer, the data is loaded to the vocoder connected to the corresponding buffer. The vocoder generates a response packet for a command packet and transmits it to the main processor 1.

The data is transmitted and received in units of 8 bits (one byte). The main processor 1 transmits and receives voice data by communicating with the vocoding module using only 4 commands: an initial setting control command, a frame rate command, a transmitting frame command and a receiving frame command.

Figure 2:
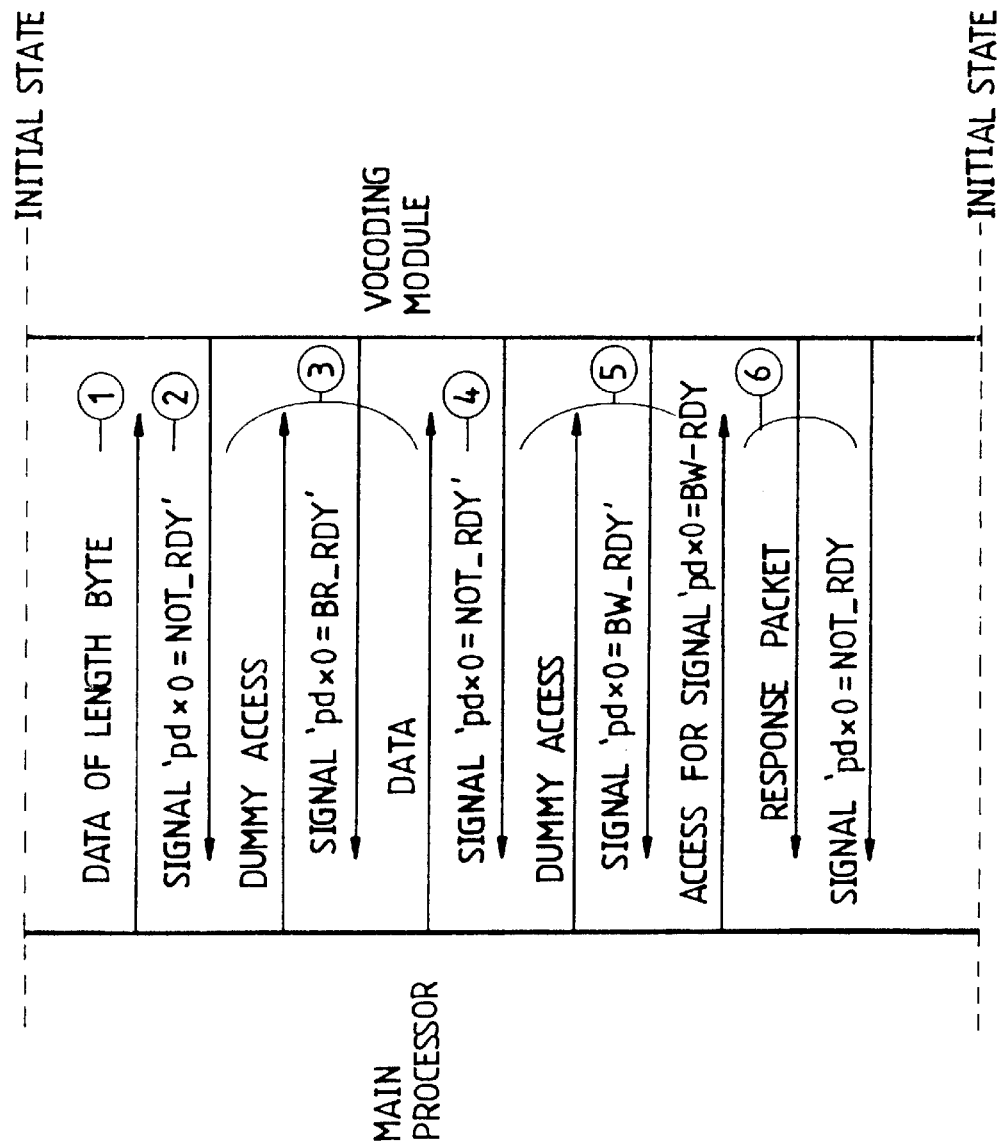
FIG. 2 is a chart illustrating a connection protocol between a main processor and a vocoding module according to the present invention.

FIG. 2 shows a connection protocol between the main processor and the vocoding module. A central processing unit of the main processor writes byte-length data into the vocoder (step ①). The vocoder receiving the data transmits a signal 'pdx0=NOT_RDY', indicating that an 8-bit parallel port register pdx0 does not complete a ready-to-receive state; clears status information stored in a status register PODS of its interior; checks the state of the status register PODS; and waits until the central processing unit seeks access (step ②).

If there is dummy access from the central processing unit, the vocoder transmits a signal 'pdx0=BR_RDY', indicating a ready-to-receive completion state and receives other data from the central processing unit (step (③)). If the vocoder receives the command packet, the vocoder transmits the signal 'pdx0=NOT_RDY' of an initial state, and generates the response packet in order to transmit a response message for the command packet received from the main processor. The vocoder again transmits the signal 'pdx0=NOT_RDY', and clears the status register. After checking the status register, the vocoder waits until the central processing unit seeks access (step ③). If there is dummy access from the central processing unit of the main processor, the vocoder transmits a signal 'pdx0=BW_RDY', indicating a ready-to-transmit completion state and waits until the central processing unit receives the signal 'pdx0=BW_RDY'(step ⑥).

If the central processing unit receives the signal 'pdx0= BW_RDY', the vocoder transmits the response packet one byte at a time. If the transmission is completed, the vocoder returns to the initial state 'pdx0=NOT_RDY'. If the data is transmitted from the main processor, the vocoder enters the ready-to-receive state (step ⑥).

A reference symbol 'pdx0' designates the 8-bit parallel port register of the interior of the vocoder (DSP1616) connected to the buffer, and 'PCODS' designates the status register notifying the state for the parallel port. 'NOT_RDY', 'BR_RDY' and 'BW_RDY' indicate specified code values between the main processor and the vocoder.

Since the vocoders are in a passive mode, the vocoders can passively interface with the main processor through the above described procedure.

In conclusion, according to this invention, one main processor can be connected to 15 vocoding modules by a simple buffer structure, without the need for a bus arbitration circuit to prevent collision. Therefore, the processing speed of the selector board and the amount of processing data can be increased, and the integration of the board is easily acheived. Further, the connection protocol can be easily used in and applied to an actual circuit.

It should be understood that the examples and embodiments described herein are illustrative purposes only and that various modifications or changes in light thereof will be suggested to persons skilled in the art and are to be included within the spirit and purview of this application and the scope of the appended claims.

We claim:

1. An interface apparatus between a selector and a plurality of vocoders in a mobile communication system, said interface apparatus comprising:

a main processor contained in said selector;

a transmitting/receiving frame tick generator for generating a transmitting/receiving frame tick every 20 msec, to be supplied to said main processor;

a buffer operation adjustor for enabling and disabling a selected buffer out of a plurality of buffers according to a control signal received from said main processor, wherein each buffer of said plurality of buffers is connected to a vocoding module within a plurality of vocoders; and said plurality of vocoders for coding and decoding a voice signal.

2. The interface apparatus of claim 1 wherein said buffer operation adjuster enables and disables said selected buffer out of a plurality of buffers by disabling the selected buffer if data is transmitted and enabling the next corresponding buffer.

3. The interface apparatus of claim 1 wherein the vocoder corresponding to the disabled buffer is are maintained at a high impedance state.

4. The interface apparatus of claim 1 further comprising a data bus directly connected to each of said buffers.

5. A method for interfacing between a selector and a plurality of vocoders in a mobile communication system, wherein said method comprises:

(a) selecting a vocoder from a plurality of vocoding modules via the main processor of a selector, wherein said selector main processor does not access said vocoder directly but rather activates a buffer connected through a vocoding module to a corresponding vocoder; and (b) maintaining other vocoders at a high impedance state, thereby allowing access to said plurality of vocoding modules by said selector main processor without the need for a bus arbitration circuit to prevent a collision.

6. An interface method between a selector and a plurality of vocoders, according to claim 5, wherein the process of accessing a corresponding vocoder by said main processor comprises the steps of:

(a) writing byte-length data from a central processing unit of said main processor, into said vocoder;

(b) transmitting a signal, from said vocoder, indicating that a parallel port register is not in a ready-to-receive state, clearing an interior status register and waiting until said central processing unit accesses said vocoder;

(c) transmitting a ready-to-receive signal from said vocoder and receiving other data into said vocoder, when there is dummy access from said central processing unit;

(d) returning to an initial state, generating a response packet from said vocoder, for a command packet, clearing said interior status register and waiting until said central processing unit accesses said vocoder, when said command packet is received;

(e) transmitting a ready-to-transmit signal from said vocoder and waiting until said central processing unit receives said ready-to-transmit signal from said vocoder, when there is dummy access from said central processing unit; and (f) transmitting said response packet from said vocoder and returning to the initial state, if said central processing unit receives said ready-to-transmit signal.

7. The method of claim 5 wherein said buffer is activated by a buffer operation adjuster.

* * * * *

UNITED STATES PATENT AND TRADEMARK OFFICE
CERTIFICATE OF CORRECTION

PATENT NO. : 6,002,999
DATED : December 14, 1999
INVENTOR(S) : Jin Soo Han, Byong Jin Cho It is certified that error appears in the above-identified patent and that said Letters Patent is hereby corrected as shown below:

Column 2, line 54: " (step (③)." should read --(step ③).--.

Column 2, line 62: "(step ③)." should read --(step ④).--.

Column 2, lines 66-67: "(step ⑥)." should read --(step ⑤).--.

Column 3, line 9: " 'PCODS' " should read --'PODS'--.

Column 4, line 2: "buffer is are maintained" should read --buffer is maintained--.

Signed and Sealed this

Twelfth Day of September, 2000

Attest:

Q. TODD DICKINSON

*Attesting Officer*   *Director of Patents and Trademarks*